US006356385B1

(12) United States Patent
Digonnet et al.

(10) Patent No.: US 6,356,385 B1
(45) Date of Patent: Mar. 12, 2002

(54) INHOMOGENEOUS BROADENING TO MODIFY THE GAIN OF AN OPTICAL AMPLIFIER

(75) Inventors: Michel J. F. Digonnet, Palo Alto, CA (US); Silviu Savin, Pebble Bay (SG)

(73) Assignee: Board of Trustees of the Leland Standford Junior University, Standford, CA (US)

( * ) Notice: Subject to any disclaimer, the term of this patent is extended or adjusted under 35 U.S.C. 154(b) by 0 days.

(21) Appl. No.: 09/245,554

(22) Filed: Feb. 5, 1999

(51) Int. Cl.[7] .................................................. H01S 3/00
(52) U.S. Cl. ..................................... 359/337; 359/341.3
(58) Field of Search ................................. 359/372, 341, 359/346; 372/4, 6, 72, 92, 94

(56) References Cited

U.S. PATENT DOCUMENTS

| | | | |
|---|---|---|---|
| 4,938,556 A | | 7/1990 | Digonnet et al. ......... 350/96.15 |
| 4,964,131 A | | 10/1990 | Liu et al. ......................... 372/6 |
| 5,177,562 A | * | 1/1993 | Wysocki et al. ............. 359/350 |
| 5,239,607 A | * | 8/1993 | da Silva et al. ............. 385/122 |
| 5,255,274 A | * | 10/1993 | Wysocki et al. ............... 372/26 |
| 5,920,424 A | * | 7/1999 | Espindola et al. .......... 359/341 |
| 5,991,068 A | * | 11/1999 | Massicott et al. ........... 359/337 |
| 6,137,813 A | * | 10/2000 | Ionov et al. ..................... 372/6 |
| 6,172,995 B1 | * | 1/2001 | Yang .............................. 372/6 |

FOREIGN PATENT DOCUMENTS

| | | | |
|---|---|---|---|
| EP | 0 859 435 A2 | 8/1998 | ............. H01S/3/06 |
| JP | 411233866 A | * 8/1999 | ............. H01S/3/10 |

OTHER PUBLICATIONS

Flattening the gain spectrum of an erbium–doped fibre amplifier by connecting an $Er^{3+}$–doped $SiO_2$–$Al_2O_3$ fibre and an $Er^{3+}$–doped multicomponent fibre, M. Yamada et al., *Electronics Letters,* Oct. 13, 1994, vol. 30, No. 21, pp. 1762–1764.

Wideband gain flattened erbium fibre amplifier using a photosensitive fibre blazed grating, R. Kashyap et al., *Electronics Letters,* Jan. 21, 1993, vol. 29, No. 2, pp. 154–156.

Long–period fiber–grating–based gain equalizers, Ashish M. Vengsarkar et al., *Optics Letters,* Mar. 1, 1996, vol. 21, No. 5, pp. 336–338.

Gain Clamped Erbium–Doped Fiber Amplifiers—Modeling and Experiment, Yuxing Zhao et al., *IEEE Journal of Selected Topics in Quantum Electronics,* Aug. 1997, vol. 3, No. 4, pp. 1008–1011.

Automatic Gain Flattening in Optical Fiber Amplifiers Via Clamping of Inhomogeneous Gain, V.L. da Silva et al., *IEEE Photonics Technology Letters,* Apr. 1993, vol. 4, No. 4, pp. 412–414.

(List continued on next page.)

*Primary Examiner*—Thomas H. Tarcza
*Assistant Examiner*—Deandra M. Hughes
(74) *Attorney, Agent, or Firm*—Knobbe, Martens, Olson & Bear, LLP (57) ABSTRACT

An optical amplifier has a gain profile which is substantially flat and independent, over a wide range, of the pump power, power of the input signals, and the number of input signals. The amplifier utilizes an optical resonator having a gain medium whose gain broadening behaves inhomogeneously by pumping the gain medium at at least one wavelength in at least one absorption tail of the gain medium. The resonator is a ring resonator that preferably includes an erbium-doped fiber. Codopants may be added to the fiber to enhance the inhomogeneous broadening effect. A method of gain flattening introduces a pump signal into a gain medium. The pump signal has a wavelength in the tail of the absorption profile of the gain medium. A plurality of optical signals at different wavelengths are introduced into the gain medium. Stimulated emission within the gain medium clamps the gain of the gain medium.

35 Claims, 6 Drawing Sheets

OTHER PUBLICATIONS

Dual–stage erbium–doped, erbium/ytterbium–codoped fiber amplifier with up to +26–dBm output power and a 17–nm flat spectrum, Paul F. Wysocki et al., *Optics Letters,* Nov. 1, 1996, vol. 21, No. 21, pp. 1744–1746.

High–power superfluorescent source with a side–pumped Yb–doped double–cladding fiber, Lew Goldberg et al., *Optics Letters,* Jul. 1, 1998, vol. 23, No. 13, pp. 1037–1039.

Cancellation of Second–Order Distortion of Directly Modulated Laser in Erbium–Doped Fiber Amplifier, Jun Ohya et al., *IEEE Photonics Technology Letters,* Apr. 1993, vol. 4, No. 4, pp. 414–416.

Ultra–Long Distance Wavelength–Division–Multiplexed Soliton Transmission Using Inhomogeneously Broadened Fiber Amplifiers, John D. Moores, *Journal of Lightwave Technology,* Apr. 1992, vol. 10, No. 4, pp. 482–487.

Broadband diode–pumped fibre laser, K. Liu et al., *Electronics Letters,* Jul. 7, 1988, vol. 24, No. 14, , pp. 838–840.

Efficient superfluorescent emission at 974 nm and 1040 nm from an Yb–doped fiber, D.C. Hanna et al., *Optics Communications,* vol. 72, No. 3,4, Jul. 14, 1989, pp. 230–234.

Desurvire, E. "Analysis of Gain Difference Between Forward–and Backward–Pumped Erbium–Doped Fiber Amplifiers in the Saturation Regime", IEEE Photonics Technology Letters, vol. 4, No. 7, Jul. 1992, pp. 711–714.*

* cited by examiner

INHOMOGENEOUS BROADENING TO MODIFY THE GAIN OF AN OPTICAL AMPLIFIER

BACKGROUND OF THE INVENTION

1. Field of the Invention

The present invention relates generally to optical amplifiers, and more specifically, to an apparatus and method of amplifying optical signals at different wavelengths such that the optical signals experience substantially equal gain.

2. Description of the Related Art

Commercially available erbium-doped fiber amplifiers (EDFAs) currently have gain over a large optical bandwidth (up to about 50 nm in silica-based fibers). Over this bandwidth, the gain may depend strongly on the wavelength of the input signal. For many applications, especially long-haul fiber communications, however, it is highly desirable to operate with wavelength-independent gain. To take advantage of the enormous fiber bandwidth, signals with different wavelengths falling within the gain bandwidth of the EDFA are carried simultaneously on the same fiber bus. If these signals experience different gains, they will have different powers at the output of the bus. This imbalance becomes more acute as the signals pass through each successive EDFA, and can be significant for very long haul distances. For example, at the output end of a transoceanic bus involving dozens of EDFAs, signals experiencing a lower gain per EDFA might carry tens of dB lower power than signals experiencing higher gain. For digital systems, the difference in signal power levels must not exceed 7 dB, or the lower power signals will be too noisy to be useful. Flattening the gain of the EDFAs would eliminate this problem and produce amplifiers that can support a considerable optical bandwidth and thus a higher data rate. Because the projected world demand for EDFAs is extremely large, developing methods to flatten the gain of amplifiers while retaining high power efficiency has been and continues to be very important.

Several methods have been developed over the past few years to produce EDFAs with as flat a gain over as broad a spectral region as possible. A first method is to adjust the parameters of both the fiber (erbium concentration, index profile, nature and concentration of the core codopants) and the pump (power and wavelength). This method can produce gains that are relatively flat (±1–2 dB), but only over a spectral region having a spectral width on the order of 10 nm, which is too limited for most applications.

Another method is to replace each EDFA by a combination of two concatenated fiber amplifiers, in which the two amplifiers have different respective gain dependencies on signal wavelength. These dependencies are designed to compensate each other and produce a fiber amplifier combination having gain that is nearly wavelength independent over a wide spectral region. (See, for example, M. Yamada, M. Shimizu, Y. Ohishi, M. Horigushi, S. Sudo, and A. Shimizu, "Flattening the Gain Spectrum of an Erbium-Doped Fibre Amplifier by Connecting an $Er^{3+}$-Doped $SiO_2$—$Al_2O_3$ Fibre and an $Er^{3+}$-doped Multicomponent Fibre," Electron. Lett., vol. 30, no. 21, pp. 1762–1765, October 1994.) This has been accomplished by using fibers having different hosts (e.g., a fluoride and a silica fiber) and with an EDFA combined with a Raman fiber amplifier.

A third gain equalization method is to add a filter at the signal output end of the Er-doped fiber, in which the filter introduces loss at those portions of the spectrum exhibiting higher gain. This approach has been demonstrated using filters made from a standard blazed fiber grating. (See, for example, R. Kashyap et al., "Wideband Gain Flattened Erbium Fibre Amplifier Using a Photosensitive Fibre Blazed Grating," Electron. Lett., vol. 29, pp. 154–156, 1993.) This approach has also been demonstrated using filters from long-period fiber gratings. (See, for example, A. M. Vengsarkar et al., "Long-Period Fiber-Grating-Based Gain Equalizers," Opt. Lett., vol. 21, pp. 336–338, March 1996.)

A fourth method is gain clamping. With this approach, the EDFA is placed in an optical resonator where it is forced to lase. In a laser cavity above threshold, at a given laser wavelength, the round-trip gain is equal to the round-trip loss, irrespective of the pump power. (See, for example, Y. Zhao, J. Bryce, and R. Minasian, "Gain Clamped Erbium-doped Fiber Amplifiers—Modeling and Experiment," IEEE J. of Selected Topics in Quant. Electron., vol. 3, no. 4, pp. 1008–1011, August 1997.)

In the gain clamping experiment of Zhao et al., the resonator was made of two fiber gratings that exhibit high reflectivity only over a very narrow bandwidth around a particular wavelength $\lambda_0$ (and little reflectivity at other wavelengths within the gain spectrum of the erbium-doped fiber), so that lasing took place only at this wavelength $\lambda_0$. The selection of $\lambda_0$ greatly affects the spectral shape of the EDFA gain. By selecting the proper laser wavelength $\lambda_0$ (1508 nm in their experiment), the gain spectrum can be relatively flat over a fairly broad region. Furthermore, the gain at $\lambda_0$ is clamped to the value of the cavity loss at this wavelength for any pump power above threshold. If the gain is homogeneously broadened, the gain at other wavelengths also remains independent of pump power (assuming the pump power is above threshold).

Figure 1A:
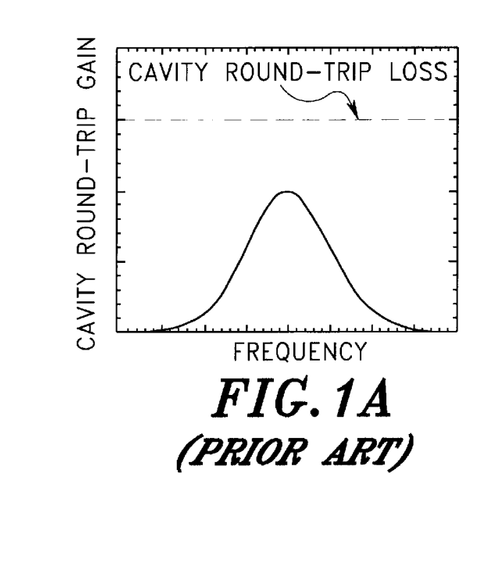
FIGS. 1A, 1B, and 1C illustrate, for homogeneous broadening, how gain varies with frequency when the pump power is below, at, and above lasing threshold, respectively.
Figure 1B:
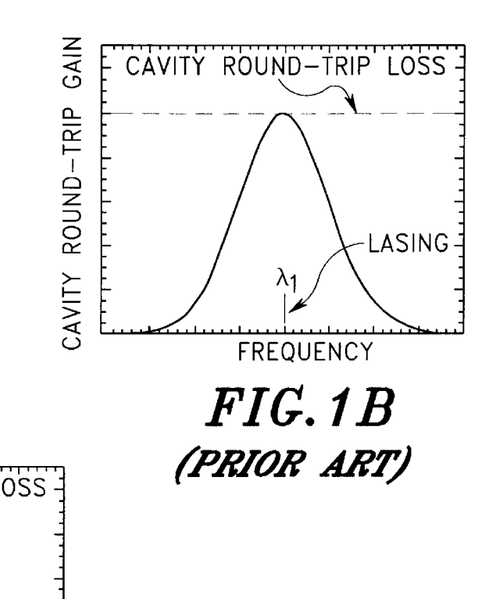
Figure 1C:
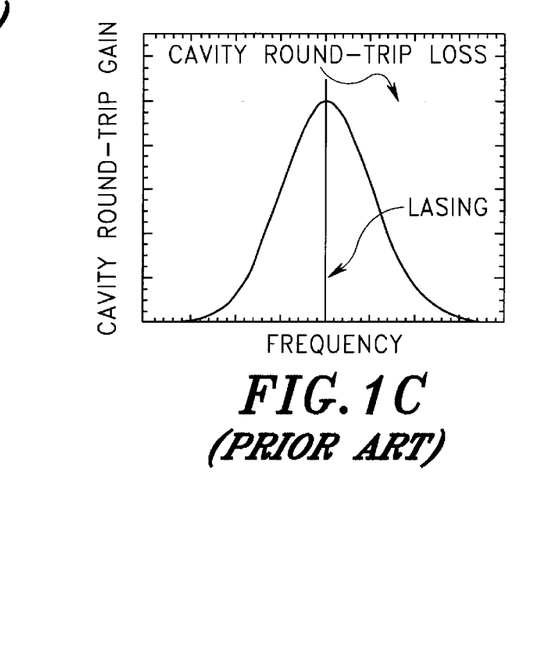

Another way to flatten the gain of a gain-clamped EDFA is to rely on the inhomogeneous broadening of the laser ions. Although reference is made herein to "laser ions," the discussion can be applied to any particle that produces lasing via stimulated emission, such as ions, atoms, and molecules. In a laser medium that is purely homogeneously broadened, all the ions exhibit the same absorption and emission spectra. When such a material is pumped below laser threshold, the round-trip gain is lower than the laser resonator round-trip loss at all frequencies across the laser gain spectrum, as illustrated in FIG. 1A, where it was assumed without loss of generality that the round-trip loss is frequency-independent across the gain spectral region. When pumped just above threshold, it begins to oscillate at the wavelength $\lambda_1$, that satisfies the condition gain=loss (see FIG. 1B). As the pump power is increased further (FIG. 1C), the condition gain=loss continues to be satisfied at $\lambda_1$, i.e., the gain at $\lambda_1$ remains constant. This can be understood from a physical point of view as follows. When the pump power is increased, the population inversion increases, which produces more intense laser emission. While circulating through the fiber, this larger laser signal depletes the population inversion via stimulated emission just enough so that the gain remains equal to the loss. Further, since the broadening is homogeneous, all ions contribute equally to the gain at $\lambda_1$, and therefore, the gain spectrum does not change. As a corollary, the laser wavelength ($\lambda_1$) and the laser linewidth also remain the same (see FIG. 1C), i.e., they are independent of pump power. This is the basis for the gain stabilization method mentioned earlier.

In a laser medium that is strongly inhomogeneously broadened, on the other hand, not all ions exhibit the same absorption and emission spectra. One reason for this behavior is that not all physical sites where the laser ions reside are identical. For example, a laser ion can reside next to a silicon ion, an oxygen ion, or an aluminum ion in the case of an aluminum-doped silica-based host. Laser ions residing at identical sites (e.g., all the laser ions next to a Si ion) will exhibit the same absorption and emission spectra, i.e., they will behave homogeneously with respect to each other. On the other hand, laser ions residing at different sites, e.g., one residing next to a Si ion and another laser ion residing next to an Al ion, will exhibit different absorption and emission spectra, i.e., they will behave inhomogeneously with respect to each other. In the case of inhomogeneous broadening, the laser medium can thus be thought of as a collection of subsets of laser ions. Ions within a given subset behave homogeneously, while ions in different subsets behave inhomogeneously.

Figure 2A:
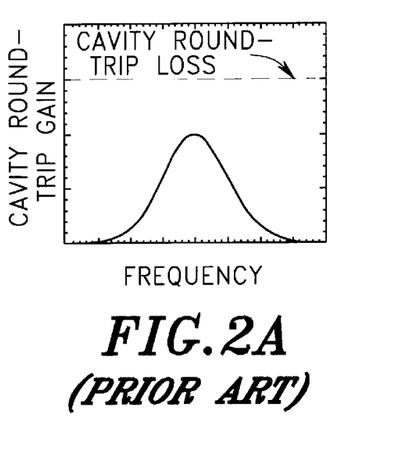
Figure 2B:
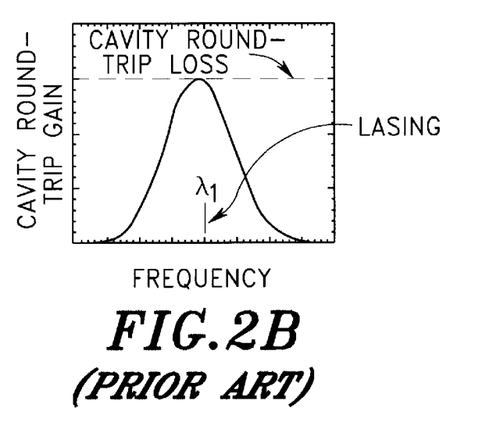
Figure 2C:
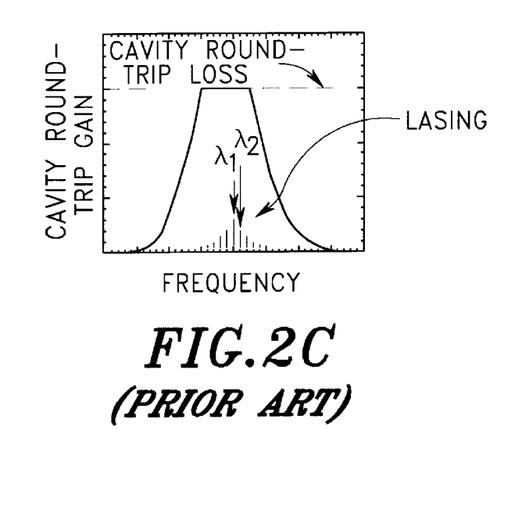
Figure 2D:
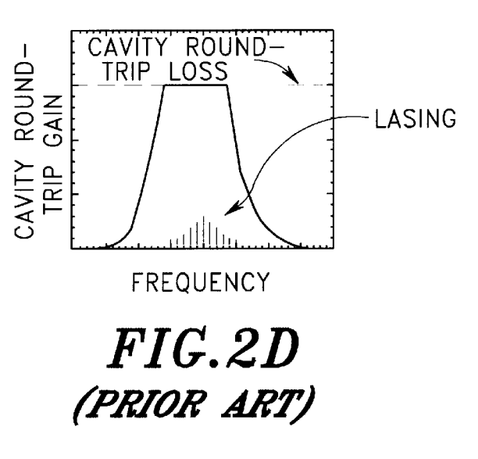

When an inhomogeneously broadened material is pumped below laser threshold, the round-trip gain is lower than the laser resonator round-trip loss at all frequencies across the laser gain spectrum, as illustrated in FIG. 2A, assuming a round-trip loss that is frequency-independent across the gain spectral region. When this material is pumped just above threshold, it will first oscillate at the wavelength $\lambda_1$ that satisfies the condition gain=loss (see FIG. 2B and compare with FIG. 2A, which is the below threshold case). This laser emission predominantly involves the ion subsets exhibiting substantial gain at $\lambda_1$. As the pump power is increased, laser emission at other wavelengths will begin to appear, although the condition gain=loss continues to be satisfied at $\lambda_1$, as illustrated in FIG. 2C. Once again, the laser medium meets this condition by producing just enough laser power to reduce the population inversion by precisely the amount that the population inversion had increased due to the increase in pump power. The gain at $\lambda_1$ is thus "clamped" at the value of the loss. However, since the broadening is inhomogeneous, the gain available from the other ion subsets peaking at wavelengths other than $\lambda_1$ is not nearly as strongly depleted by the laser power at $\lambda_1$. Consequently, as the pump power is increased, the gain at these other wavelengths (for example, wavelength $\lambda_2$) increases until it reaches the level of the loss at that wavelength, and the medium begins to lase at $\lambda_2$. At this point, the gain is clamped at both $\lambda_1$ and $\lambda_2$. In general, because the gain curve is bell-shaped, $\lambda_2$ is very close to $\lambda_1$ (FIG. 2C). As still more pump power enters the fiber (FIG. 2D), more and more wavelengths begin to lase. In practice, each of these discrete laser lines actually has a finite linewidth. Thus, if these discrete lines are close enough to each other, they merge with each other and the net effect of this increase in the number of lasing lines is that the laser linewidth broadens. In short, an inhomogeneously broadened laser medium tends to produce laser emission that broadens with increasing pump power. The laser linewidth can in principle increase in this fashion until it reaches the gain linewidth.

In general, the laser transitions of triply ionized rare earth elements like $Er^{3+}$ are broadened by both homogeneous and inhomogeneous processes. Homogeneous mechanisms broaden the linewidth of the transitions between the Stark sublevels of the erbium ions in the same manner for all Er ions in the host. On the other hand, some inhomogeneous mechanisms produce changes in the distribution of the Stark sublevels which are not the same for all ions, but which depend on the ion subset.

At room temperature, the 1.55 $\mu$m transition in Er-doped silica is predominantly homogeneously broadened. However, by cooling the material to cryogenic temperatures, it is possible to reduce the homogeneous broadening and produce a laser that oscillates over a relatively broad spectral range of constant gain (equal to the resonator loss). This effect has been used to produce flat gain in an EDFA operated at 77° K. (See, for example, V. L. da Silva, V. Silberberg, J. S. Wang, E. L. Goldstein, and M. J. Andrejco, "Automatic gain flattening in optical fiber amplifiers via clamping of inhomogeneous gain," *IEEE Phot. Tech. Lett.*, vol.5, no. 4, pp. 412–14, April 1993.) However, this approach is in general impractical because of the apparatus required to cool the fiber.

SUMMARY OF THE INVENTION

A preferred embodiment of the present invention utilizes the inhomogeneous broadening of the 1.55 $\mu$m transition of erbium to produce flat gain in an erbium-doped fiber amplifier without the need to cool the fiber to cryogenic temperatures. Gain broadening can be stimulated by pumping the fiber on the edge of the absorption band of the erbium ions, in contrast to existing erbium doped fiber amplifiers (EDFAs), which are pumped at or near the center of the 980-nm absorption band. Alternatively, the erbium doped fiber can be pumped at multiple wavelengths simultaneously to excite a large number of subsets of erbium ions, producing gain over the broadest possible spectral region. For example, for pumping on the $^4I_{15/2} \rightarrow {}^4I_{11/2}$ transition, the pump wavelengths can be distributed, uniformly or otherwise, between around 970 nm and around 990 nm to cover a substantial portion of the absorption spectrum. The ideal spectral extent of the pumping spectrum depends on the absorption spectrum of the particular erbium-doped fiber used, which itself depends on the codopants present in the fiber's core region.

One preferred embodiment of the invention is an optical amplifier that includes an optical resonator for producing clamped gain, in which the resonator includes a gain medium that has an absorption profile and a gain profile, with the gain profile being characterized at least in part by inhomogeneous broadening. The optical amplifier further includes an optical pump source for pumping the gain medium at at least one wavelength in a tail of an absorption transition of the gain medium to utilize the inhomogeneous broadening to flatten the gain. In one preferred embodiment, the optical resonator is a ring resonator, and the gain medium includes a doped fiber.

Yet another preferred embodiment of the invention is an optical amplifier that includes an optical resonator for producing clamped gain, in which the resonator includes a gain medium having an absorption profile and a gain profile, with the gain profile being characterized at least in part by inhomogeneous broadening. This embodiment further comprises an optical pump source for pumping the gain medium in a tail of an absorption transition of the gain medium to utilize the inhomogeneous broadening to modify the gain, and also comprises a wavelength-dependent loss element for adjusting the loss to produce a desired gain profile.

Still another preferred embodiment of the invention is a method for producing an optical amplifier having substantially flat gain, in which the method includes introducing a pump signal into a gain medium having an absorption profile and a gain profile, in which the gain medium resides within a resonator. The gain profile is characterized at least in part by inhomogeneous broadening, and the spectral output of the pump signal is selected to pump a tail of the absorption profile to utilize the inhomogeneous broadening of the gain medium. This method further comprises injecting a plurality of optical signals of different wavelengths into the gain medium to amplify the optical signals, in which the respective wavelengths of the optical signals fall within the gain profile of the gain medium, and utilizing stimulated emission within the gain medium to clamp the gain of the gain medium over a spectral region that includes the wavelengths of the optical signals. Amplified optical signals are then extracted from the gain medium. In one preferred embodiment of this method, one or more codopants may be added to the gain medium to enhance the inhomogeneous broadening of the gain profile. In another preferred embodiment of this method, the gain may be controlled by varying loss within the resonator. In yet another preferred embodiment of this method, the gain flatness may be controlled by adjusting a wavelength dependent loss element within the resonator.

BRIEF DESCRIPTION OF THE DRAWINGS

FIGS. 2A, 2B, 2C, and 2D, illustrate, for inhomogeneous broadening, how gain varies with frequency when the pump power is below, at, above, and significantly above lasing threshold, respectively. In FIG. 2C, lasing occurs over a relatively narrow spectral region, whereas in FIG. 2D lasing occurs over a relatively broad spectral region.

DETAILED DESCRIPTION OF THE PREFERRED EMBODIMENT

Figure 3A:
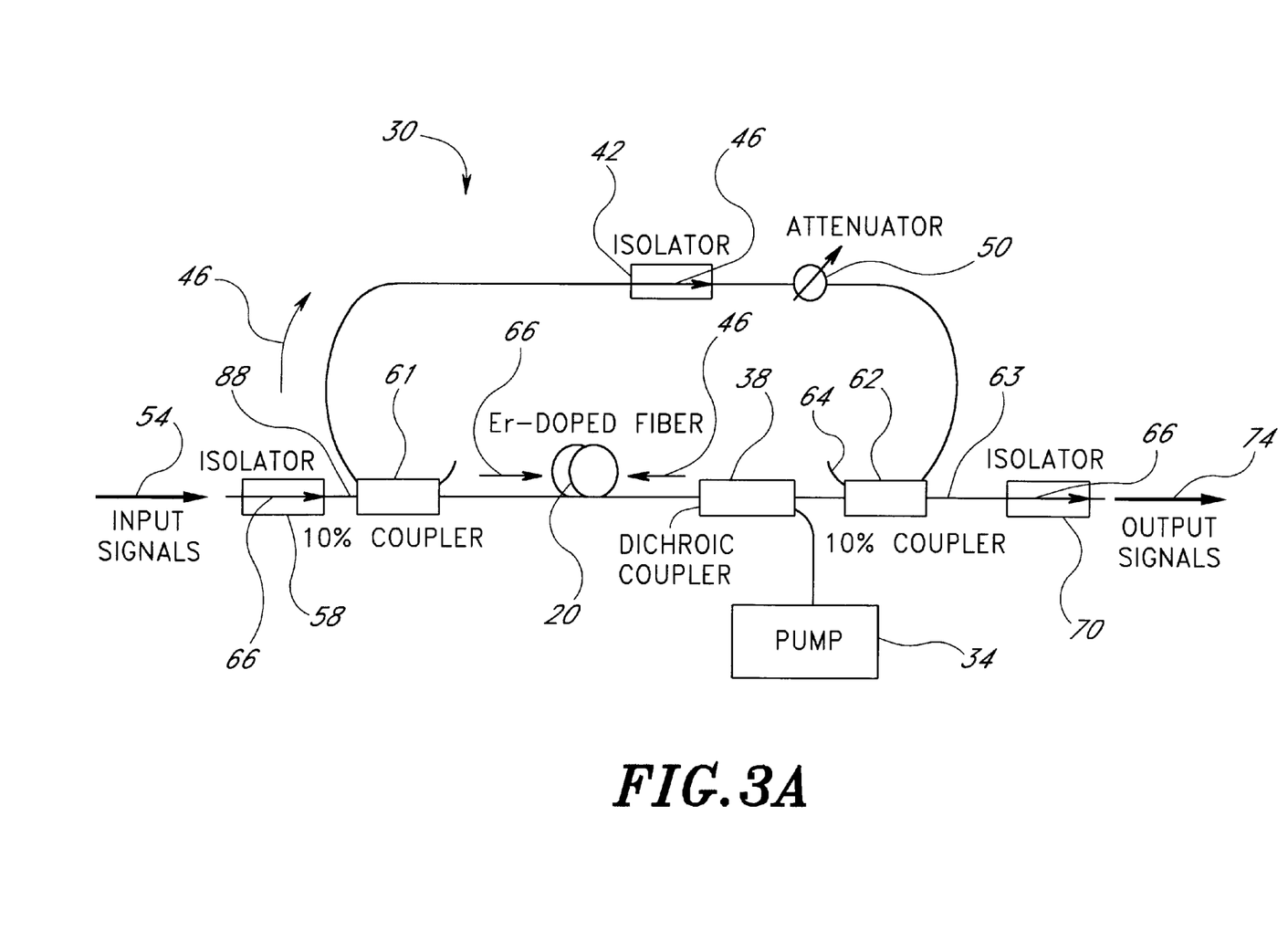
FIGS. 3A and 3B illustrate preferred embodiments of the invention, in which input signals are injected into an optical amplifier that produces flat, clamped gain across the gain profile of the gain medium.

One preferred embodiment of the invention is shown in FIG. 3A. A gain medium 20 is preferably an erbium-doped fiber amplifier (EDFA) in which erbium acts as the laser ion. The gain medium 20 forms part of an optical resonator 30. Other optical gain media may be used, such as doped integrated optical waveguides, bulk gain media, and semiconductors such as GaAs. An optical pump source 34 for pumping the erbium-doped gain medium 20 may advantageously comprise a near-infrared diode laser that emits at one or more lines in the spectral region 950–1000 nm. The pump light is coupled to the erbium-doped fiber by a dichroic coupler 38, e.g., a wavelength-division multiplexer that couples substantially all of the pump power into the resonator 30 but couples substantially none of the laser signal 54 out of the ring. FIG. 3A illustrates only one of several possible pumping configurations. For example, the erbium-doped fiber 20 could be pumped forward, backward, or in both directions simultaneously (bidirectional pumping) by the suitable placement of one or more dichroic couplers 38 or combiners on either side of the erbium-doped fiber. The combiner can be a standard fiber wavelength-division multiplexer, a polarization beam combiner, or any number of waveguide or bulk optic combiners well known in the art. The spectral output of the optical pump source 34 is selected to take advantage of the inhomogeneous broadening inherent in erbium-doped fiber to permit clamping of the gain over all or a substantial portion of the gain profile, either in a single spectral region or a series of smaller, closely spaced spectral regions. For example, the optical pump source 34 may be operated at a discrete wavelength in an absorption tail (wing) of an absorption transition in erbium, at either the long wavelength side or the short wavelength side of the absorption transition. When the gain medium is an Er-doped fiber, possible pump absorptions include the $^4I_{15/2} \rightarrow {}^4I_{13/2}$ transition near 1480 nm and the $^4I_{15/2} \rightarrow {}^4I_{11/2}$ transition near 980 nm. However, pumping in the long wavelength tail is not possible when pumping on the $^4I_{15/2} \rightarrow {}^4I_{13/2}$ transition. Alternatively, both the short wavelength tail and the long wavelength tail of the absorption transition may be pumped. Either a broadband pump source or a multiple wavelength source may be used. By pumping the gain medium 20 in this manner, the broadening of the gain profile of the erbium doped fiber behaves more inhomogeneously than if it were pumped near line center, thereby facilitating gain clamping over a broader region. The optical pump source 34 is preferably coupled into the resonator 30 with a dichroic coupler 38. As used herein, a broadband pump source means a light source that emits light over a broad spectral region (i.e., a spectral region with a width that is a sizeable fraction, e.g., 20%, of the linewidth of the pump band used), such as a superfluorescent fiber source (SFS) or a source based on amplified spontaneous emission. For example, the erbium doped fiber 20 may be co-doped with ytterbium, as taught for example in P. F. Wysocki, P. Namkyoo, and D. DiGiovanni, "Dual-stage erbium-doped, erbium/ytterbium-codoped fiber amplifier with up to +26-dBm output power and a 17-nm flat spectrum," Optics Letters, vol. 21, no. 21, pp. 1744–1746, Nov. 1, 1996. As is well known in the art, such an Er/Yb fiber can be pumped near 1060 nm, with the pump radiation being absorbed by the Yb ions of the amplifier fiber, which transfer their excited energy to the erbium ions, leading to a population inversion of the erbium ions. Such an Er—Yb doped amplifier fiber can be pumped with a Yb-doped superfluorescent fiber source (in which ytterbium acts as the laser ion in the superfluorescent fiber source), a source that can be designed to emit high power over a broad spectral region near the 1040–1080 nm window. (See, for example, L. Goldberg, J. P. Koplow, R. P. Moeller, and D. A. V. Kliner, "High-power superfluorescent source with a side-pumped Yb-doped double-cladding fiber," Optics Letters, vol. 23, no. 13, pp. 1037–1039, Jul. 1, 1998.) The bandwidth of the broadband pump source can be tailored to the desired value, e.g., with internal or external filters, or by other optical means.

The resonator 30 is preferably a ring resonator in which laser emission from the erbium-doped fiber 20 is forced by an optical isolator 42 to circulate unidirectionally through the resonator, namely, in the direction indicated by arrows 46. At least one attenuator 50 within the resonator 30 is preferably used to control the loss within the resonator. Because at a particular laser wavelength, the round-trip loss within the laser resonator 30 is equal to the round-trip gain, the attenuator 50 effectively controls the overall resonator gain as well. The attenuator 50 may be advantageously variable (i.e., have a variable loss), or its loss may be wavelength dependent to produce a desired gain profile (e.g., to flatten the gain profile), or it may be both variable and wavelength dependent. For example, by introducing a non-uniform loss element within the gain profile, it is possible to compensate for an otherwise non-uniform loss spectrum within the resonator 30 and produce a substantially flat gain spectrum. Also, a wavelength dependent attenuator 50 may be located external to the resonator 30, instead of or in addition to the attenuator 50 inside the resonator. Several models of variable attenuators are commercially available, such as those made by Johanson company, Boonton, N.J. (e.g., model #2504F7B50C). The attenuator 50 may include a wavelength-dependent loss element such as a photoinduced fiber grating (see, for example, A. M. Vengsarkar et al., "Long-Period Fiber-Grating-Based Gain Equalizers," *Opt. Lett.*, vol. 21, pp. 336–338, March 1996) or a mechanical fiber grating.

Input optical signals 54 enter the optical resonator 30 through an optical isolator 58 and a first coupling device such as an optical coupler 61 (e.g., a coupler having 10% coupling (or 90% transmission) at the signal and laser wavelengths) so that the input signals propagate counter to the direction of the erbium-doped laser emission, i.e., the input signals 54 propagate in the direction indicated by the arrows 66. After passing through the gain medium 20 and the dichroic coupler 38, the optical signals exit the resonator 30 by passing through a second coupling device such as an optical coupler 62 (e.g., again a 10% coupler) at port 63, and then a second isolator 70, where the optical signals are designated as output optical signals 74. Because the ring laser emission circulates in the direction opposite to that of the signals 54 being amplified, the ring laser signal is not output at the coupler 62 but at another port of this coupler, namely port 64. The embodiment of FIG. 3A thus permits the output optical signals 74 to be cleanly separated from the laser emission of the erbium fiber 20.

The couplers 61, 62 preferably have a coupling ratio as small as possible at the signal wavelength to minimize the loss imparted to the input signals 54. This means moving towards the limit of 0% couplers. For example, with 1% couplers the coupling "loss" experienced by the input signals 54 at the coupler 61 (and the tapped-out signals 74 at the coupler 62) would be very low (1%), which is good. By the same token, the coupling "loss" for the ring laser signal would be very high (99%), which is also good since a high cavity loss is desirable (to obtain a high EDFA gain). Thus, the couplers 61 and 62 can be used to adjust the ring loss and therefore the gain experienced by the signals (although the relationship between the couplers' coupling ratios and the net gain experienced by the signals would need to be carefully modeled). Thus, an alternative to using the variable attenuator 50 is to use the coupling ratios of either or both couplers to vary the gain level.

With reference to FIG. 3A, the lower the coupling ratio of the coupler 61, the lower the loss imparted by the coupler 61 to the input signals 54. Similarly, the lower the coupling ratio of the coupler 62, the lower the loss imparted by the coupler 62 to the amplified signals. Therefore, the lower the coupling ratios of couplers 61 and 62, the lower the loss experienced by the signal as it travels through the amplifier of FIG. 3A, and consequently the higher the net gain seen by the signal (or, conversely, the lower the pump power required to achieve a given net gain). In view of the foregoing, for a given required net gain, it is advantageous to reduce both coupling ratios. One way to reduce the coupling ratios is to reduce the loss of the other elements in the loop, in particular, the attenuator 50 and the isolator 42. (Furthermore, the loss of the dichroic coupler 38 should be as low as possible. This has three benefits: the pump power lost in the dichroic coupler 38 is reduced; the amount of signal power lost in the dichroic coupler 38 is reduced; and lower coupling ratios for couplers 61 and 62 may be selected.) For example, if 20 dB of clamped gain is required, one possible configuration is a wavelength-dependent attenuator 50 with a background (wavelength-independent) loss of 2 dB and coupling ratios for each of the couplers 61 and 62 of 12.6% (a transmission of 9 dB), i.e., a total loop loss of 2×9+2=20 dB (assuming that all other loop elements have negligible loss). A preferable solution is to utilize a wavelength-dependent attenuator 50 with a background (wavelength-independent) loss of 0 dB and coupling ratios for each of the couplers 61 and 62 of 10% (or a transmission of 10 dB), i.e., a total loop loss of 2×10+0=20 dB. In the former case, each of the two couplers 61 and 62 imparts to the signal a loss of 12.6%. In the second case, each of the two couplers 61 and 62 imparts a loss to the signal of 10%, corresponding to 2 dB less round-trip signal loss than in the first case.

Figure 3B:
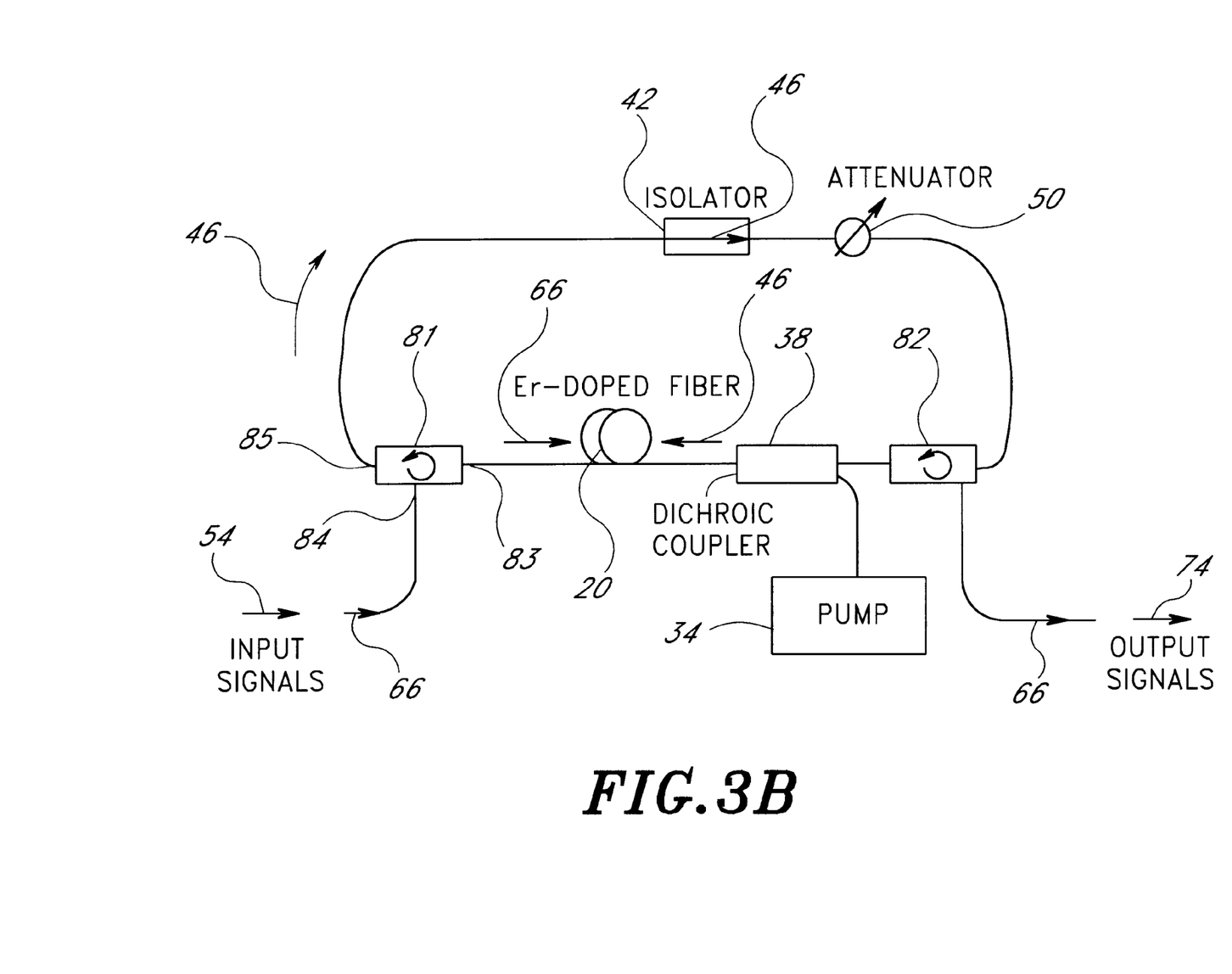

Alternatively, one (or both) of the couplers 61 and 62 may be replaced by another coupling device(s) such as an optical circulator(s). This is shown in FIG. 3B, which is similar to FIG. 3A, except that the couplers 61 and 62 have been replaced with optical circulators 81 and 82, and the input and output isolators 58 and 70 have been removed. In this embodiment, the input signals 54 suffer no splitting loss in the input circulator 81, and the output signals 74 suffer no splitting loss in the output circulator 82. The benefit is that the signal loss is lower, so that lower gain is required from the amplifier 20 (and hence lower pump power is required). On the other hand, unlike the couplers 61 and 62, the circulators 81 and 82 cannot provide the required high resonator loss (in the case of a high-gain amplifier)—the variable attenuator 50 must be used to that end. Current commercial circulators exhibit a small internal loss, around or just under 1 dB. However, there is no fundamental limit to this loss, and it can be expected to drop in future circulator designs.

Note that the optical circulator 81 (and the optical circulator 82) is a three-port device which operates in a well-known manner to cause substantially all the light entering through port 84 to be coupled out of the next adjacent port, i.e. port 83. An optical circulator is a unidirectional device, which means that light circulates in the circulator in one direction only (i.e., counterclockwise in FIG. 3B). Thus, light returning from the resonator ring and entering the port 83 of the circulator 81 is coupled through the third port 85 of the circulator 81, and does not exit the port 84 of the circulator 81. The circulator 81 thus operates as an isolator to prevent light entering the ring resonator from port 84 from propagating directly to the port 85. An exemplary optical circulator is available from E-TEK Dynamics, Inc., 1885 Lundy Avenue, San Jose, Calif. 95131.

Another advantage of the embodiment shown in FIG. 3B is that the input and output isolators 58 and 70 of FIG. 3A are no longer needed. The reason is that the isolator 42 inside the ring works with the circulators 81 and 82 to act as an isolator. As far as the output isolation is concerned, any stray signal coming back from the output port 83 (of the circulator 81) into the output circulator 82 will be directed towards the isolator 42, where it is effectively lost without ever entering the Er-doped fiber amplifier 20. Thus, the amplifier 20 is isolated from any feedback from the output port 83. With respect to the input isolation, no light comes out of the ring into the input port 84 (of the circulator 81). The reason is that any backward signal coming from the Er-doped fiber 20 towards the input circulator 81 (in particular, spurious reflections of the signals and ASE signal generated by the Er-doped fiber) will enter the input circulator, which will direct them into the ring. Thus, this backward signal never goes into the input port 84. This is not the case in the embodiment of FIG. 3A, in which the input coupler 61 directs 90% of the spurious signals into the input port 88 of coupler 61, which is why that embodiment requires an input isolator 58. Note that an input and output isolator can still be used in the embodiment of FIG. 3B if better isolation than that provided by the circulators 81 and 82 and isolator 42 is required. Alternatively, only one of the circulators may be used. For example, on the signal output side of FIG. 3B, the circulator 82 may be replaced by the coupler 62/isolator 70 arrangement shown on the signal output side of FIG. 3A.

The wavelengths of the input signals 54 are preferably selected to fall within the gain profile of the gain medium 20, which for an erbium-doped fiber is broad and preferably at least 5 nanometers (nm) wide. When the pump power is high enough that the gain exceeds the loss, the resonator 30 effectively clamps the gain across the gain profile, so that all of the input signals experience equal gain as they pass through the erbium-doped fiber 20. The result is that the input signals 54 are uniformly amplified. The embodiments of FIGS. 3A and 3B also offer the advantage of producing gain that is insensitive to pump power variations over a wide range of pump power (i.e., a range between the pump power threshold and the highest pump power available from the pump source).

The reason for this insensitivity is that if the ring laser 30 is pumped relatively far above threshold, the gain is significantly depleted from its small-signal value by the circulating ring laser emission. If the pump power were to increase from its nominal value, as explained earlier in relation to FIGS. 2C and 2D, the gain would remain clamped at the same value, but the gain bandwidth would increase (assuming the gain bandwidth has not reached its optimum value for this nominal pump power). If the pump power were to decrease from its nominal value, the gain would again remain clamped at the same value (provided the pump power is not decreased below threshold), and the gain bandwidth would also decrease. Consequently, (1) the gain value is immune to variations in pump power, provided the pump power does not drop below threshold, and (2) the gain bandwidth does depend on pump power. However, by ensuring that for the lowest expected value of the pump power the gain bandwidth is larger than the spectral bandwidth occupied by the combined input signals, the gain bandwidth will always be sufficiently wide and all the input signals 54 will experience the same gain independently of pump power variations.

Similarly, the embodiments of FIGS. 3A and 3B offer the advantage of producing gain that is insensitive to the power of the input signals 54 over some range of signal power, and insensitive to variations in the number of input signals, over some range of variations in number of input signals. This behavior can be explained as follows. If the number of input signals 54 is kept constant but the power of some or all of the input signals is increased, the population inversion of the erbium-doped fiber will remain constant so that the gain remains constant. The laser accomplishes this by lowering the ring laser power. However, if the pump power is high enough, the laser will continue to lase, although over a narrower linewidth. Thus, the gain will remain clamped at its original value, although the gain bandwidth will decrease. As explained in the previous paragraph, this decrease in gain bandwidth is inconsequential provided that at its minimum possible value, the bandwidth is still wide enough to provide flat gain for all the input signals 54. A similar argument can be made if the number of input signals 54 changes while the individual signal power is kept constant. For example, if one or more of the input signals 54 is dropped, the gain will remain clamped at the same value, and the gain linewidth will increase (assuming again that it is not already at its maximum possible value).

This insensitivity to pump power, signal power, and number of input signals 54 is particularly important in optical communication systems. For example, the number of input signals traveling through an amplifier such as the one described in this invention may vary over time as the number of users fluctuates, or in the event of accidental failure of one of the light sources that supply the optical signals. Similarly, the input signal power and pump power may also vary over time, for example, as a result of aging or failure of the light sources that supply them.

Although multiple-wavelength pumping may be used, broadband pumping is expected to yield better results. One broadband pump source for the erbium-doped fiber 20 is a superfluorescent fiber source (SFS) made of a ytterbium-doped fiber pumped near 980 nm, which can produce tens of mW of superfluorescent emission in the 0.97–1.04 µm range. (See, for example, D. C. Hanna, I. R. Perry, P. J. Suni, J. E. Townsend, and A. C. Tropper, "Efficient superfluorescent emission at 974 nm and 1040 nm from an Yb-doped fiber," *Opt. Comm.*, vol. 72, nos. 3–4, pp. 230–234, July 1989.) The spectral output of these fibers depends in part upon their length, with longer fibers favoring emission at longer wavelengths. One short fiber (0.5 m) produced emission at 974 nm with a 2 nm bandwidth, while a long fiber (5 m) produced emission at 1040 nm with a 19 nm bandwidth. (See D. C. Hanna, et al. cited above.) Such an SFS can be used in its short wavelength range to broadband-pump an Er-doped fiber (provided that when the SFS is long enough to run at 980 nm, its linewidth is broad enough). The SFS can also be used in its long wavelength range to broadband-pump an Er/Yb-doped fiber (which is typically pumped in the 0.98–1.064 µm range).

Another embodiment of the invention is related to the composition of the core of the erbium-doped fiber 20. Increasing the number of codopant species in the core creates a greater variety of physical sites in which the erbium ions can reside. Since each site induces a slightly different Stark splitting of the erbium ions, the inhomogeneous broadening of the erbium ions will increase as codopant species are added. In general, the larger the number of network modifying codopants, the more inhomogeneous the gain is expected to be. This principle applies to any laser ion (not just $Er^{3+}$) and fiber host (not just silica or fluoride glasses).

The codopants that are preferably introduced into the core of the fiber 20 are the so-called network modifiers, which tend to improve the solubility of the rare earth ions in the glass host. Codopants that act at least in part as network modifiers include, but are not limited to: K, Ca, Na, Li, and Al. Codopants known as index modifiers, such as Ge, do not generally improve the solubility of the rare earth ions but may be introduced into the fiber to control, for example, the fiber's index of refraction. However, Ge tends to increase the inhomogeneous linewidth of the gain of an erbium-doped silica-based fiber. (See V. L. da Silva et al., cited above.)

Figure 4:
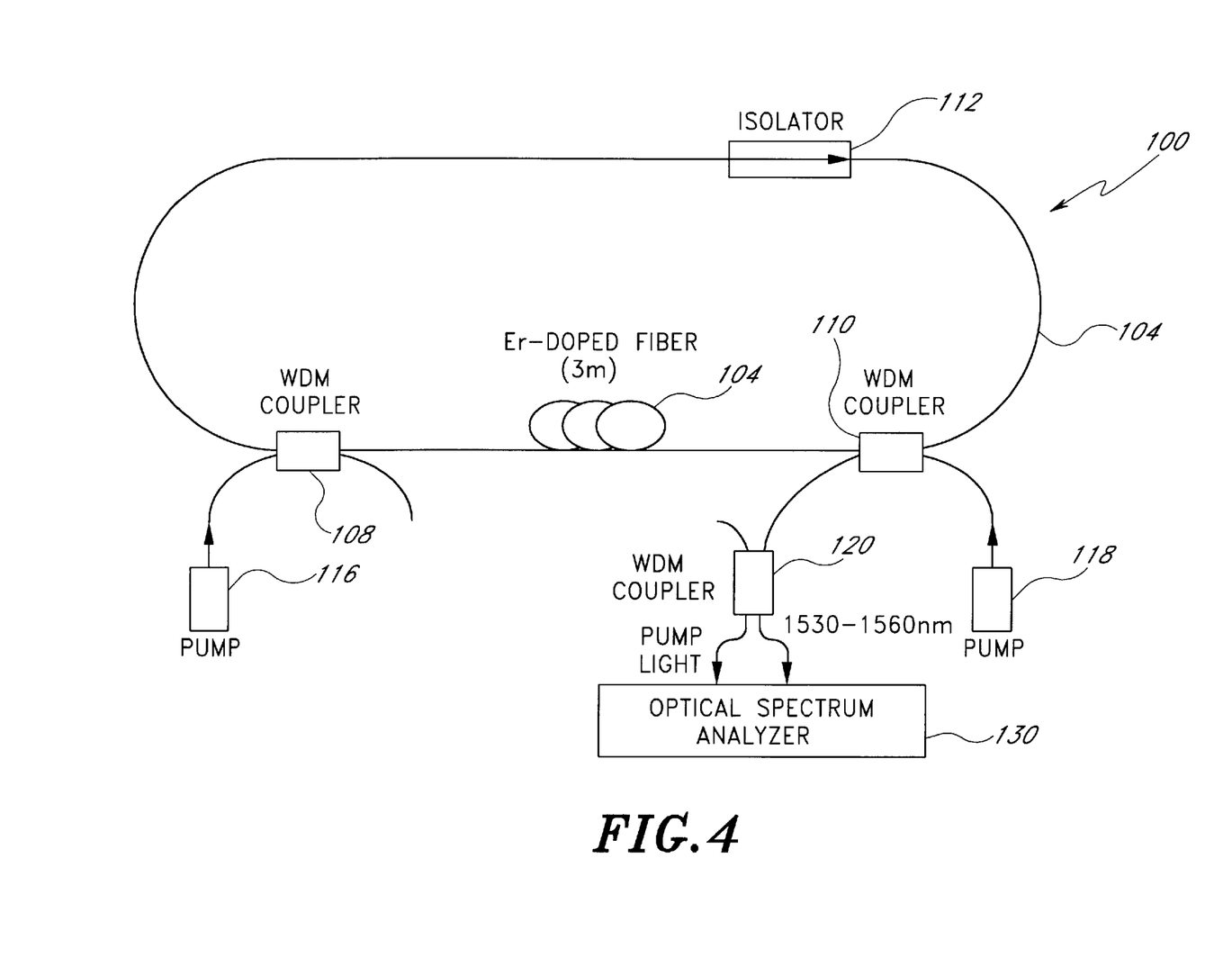
FIG. 4 illustrates an experimental test setup for analyzing the spectral output from an erbium-doped fiber situated within a ring laser.

The enhancement of inhomogeneous gain broadening by pumping in the tail of the absorption profile has been demonstrated using the fiber ring laser 100 shown in FIG. 4. The laser 100 comprises a 3-m length of Er-doped fiber 104, two WDM fiber couplers 108 and 110, and an optical isolator 112 to force laser oscillation in a single direction. The fiber ring laser 100 is pumped with two pump laser diodes 116 and 118 operating at 980 nm. The laser diodes 116 and 118 are coupled into the ring laser 100 via the respective first and second WDM fiber couplers 108 and 110. The second WDM coupler 110 is also used to extract laser signal from the ring laser 100. A third WDM coupler 120, placed at the output of the ring laser 100, is used to separate unabsorbed 980 nm pump from the laser signal of the ring laser 100, the laser signal being in the range from about 1530 to about 1570 nm. The spectra of each of these two signals are observed independently on an optical spectrum analyzer 130.

Figure 5:
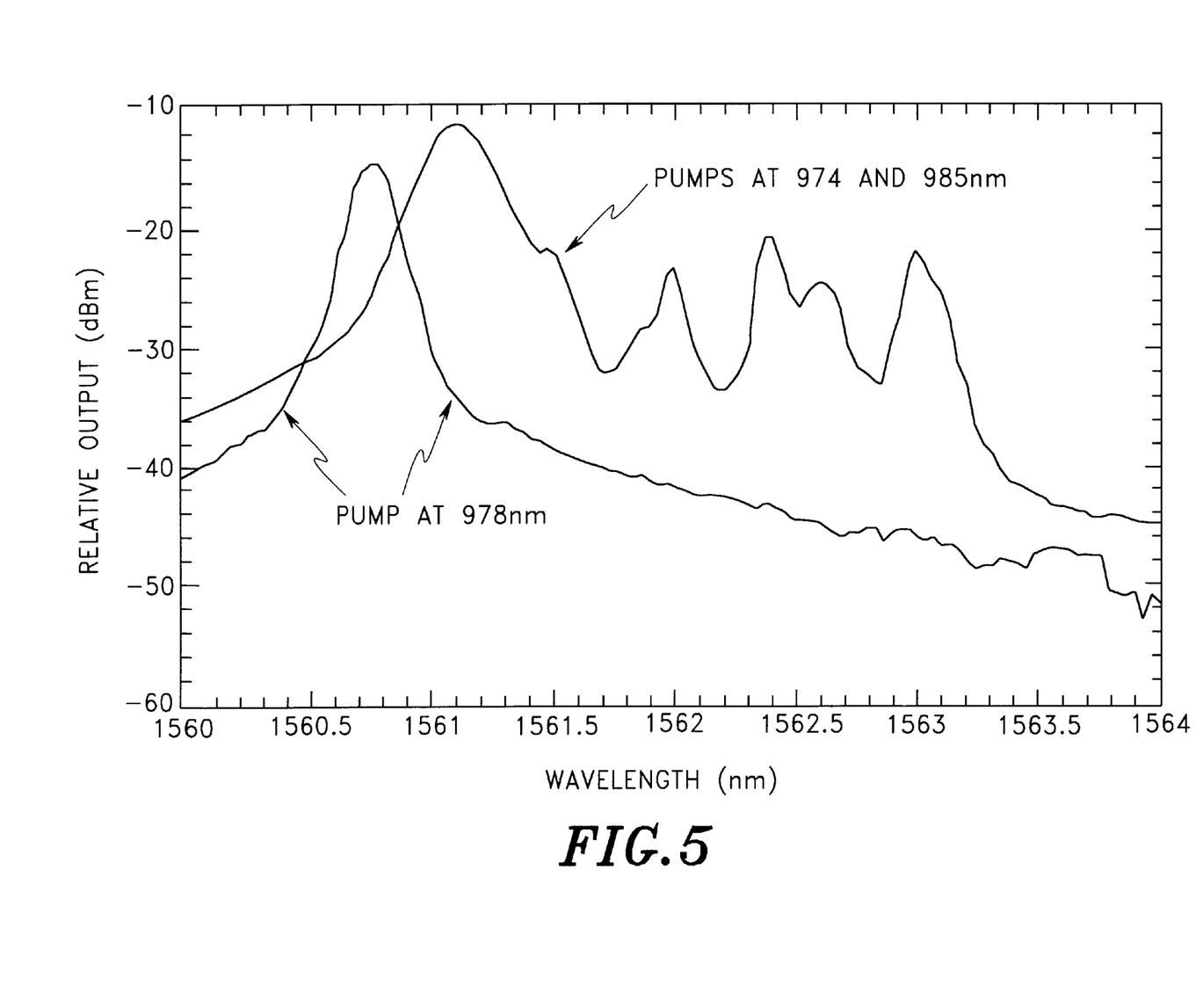
FIG. 5 shows how the spectral output from the setup of FIG. 4 varies as a function of the pump spectrum.

FIG. 5 shows the spectrum of the output of the fiber ring laser 100 measured under two different pumping conditions.

When the ring laser 100 is pumped with only one laser diode at 978 nm, i.e., near the center of the $^4I_{15/2} \to {}^4I_{11/2}$ absorption transition of the Er-doped fiber, the ring laser output exhibits a relatively narrow spectrum (a few tenths of a nm) centered around 1560.8 nm. On the other hand, when the ring laser 100 is pumped with two lasers diodes, one at 974 nm and the other at 985 nm, the spectrum of the ring laser is considerably broader, extending from about 1561 nm to 1563 nm. Other experiments suggest that a bandwidth of 14 nm or more may be achieved. Although the gain spectrum of the Er-doped fiber has not been measured with either pumping arrangement, the results of FIG. 5 show that pumping an Er-doped fiber on the tail(s) of its absorption band produces broader emission from the fiber than when pumping just at the absorption center, presumably due to the simultaneous excitation of a larger number of $Er^{3+}$ subsets in the tail pumping case. In addition to pumping the tail of the 980 nm absorption band as disclosed herein, inhomogeneous broadening might also be observed by pumping the tail of the 1480 nm absorption band.

The invention may be embodied in other specific forms without departing from its spirit or essential characteristics. The described embodiments are to be considered in all respects only as illustrative and not restrictive. The scope of the invention is therefore indicated by the appended claims rather than by the foregoing description. All changes which come within the meaning and range of equivalency of the claims are to be embraced within that scope.

What is claimed is:

1. An optical amplifier, comprising:
    an optical resonator for producing clamped gain, said resonator including a gain medium having an absorption profile and a gain profile, wherein the gain profile is characterized at least in part by inhomogeneous broadening; and
    an optical pump source for pumping said gain medium at at least one wavelength in a tail of an absorption transition of said gain medium to utilize the inhomogeneous broadening to flatten the gain.

2. The amplifier of claim 1, wherein the gain across the gain profile is substantially constant.

3. The amplifier of claim 1, wherein said optical pump source pumps the long wavelength side of the absorption transition.

4. The amplifier of claim 1, wherein said optical pump source pumps the short wavelength tail of the absorption transition.

5. The amplifier of claim 1, wherein said optical pump source pumps both the short wavelength tail and the long wavelength tail of the absorption transition.

6. The amplifier of claim 1, wherein said gain medium comprises a doped fiber.

7. The amplifier of claim 1, wherein said gain medium comprises erbium, said erbium acting as a laser ion.

8. The amplifier of claim 1, wherein said optical pump source has an output that is broadband.

9. The amplifier of claim 1, wherein said optical pump source has an output at at least one discrete wavelength.

10. The amplifier of claim 1, wherein said resonator is a ring resonator.

11. The amplifier of claim 10, wherein said ring resonator comprises an optical isolator to restrict laser oscillation to a single direction.

12. The amplifier of claim 11, in which input signals to said optical amplifier propagate counter to the direction of the laser oscillation.

13. The amplifier of claim 1, further comprising a wavelength dependent loss element for compensating a non-uniform loss profile to produce a desired gain profile.

14. The amplifier of claim 1, wherein said optical pump source is a superfluorescent fiber source.

15. The amplifier of claim 14, wherein said superfluorescent fiber source comprises ytterbium as a laser ion.

16. The amplifier of claim 1, wherein said gain medium comprises at least one codopant for enhancing the inhomogeneity of said gain medium.

17. The amplifier of claim 16, wherein said codopant comprises a network modifier.

18. The amplifier of claim 16, wherein said codopant includes at least one element selected from the group consisting of K, Ca, Na, Li, Al, and Ge.

19. The amplifier of claim 1, wherein said gain medium provides flat, broad gain over a spectral region of at least 5 nanometers.

20. The amplifier of claim 1, further comprising a variable attenuator for controlling the level of loss to produce a desired level of gain in said gain medium.

21. The amplifier of claim 1, further comprising an optical source for generating input signals of different wavelengths.

22. The amplifier of claim 21, wherein the input signals and laser oscillation from said gain medium are counter-propagating.

23. The amplifier of claim 1, further comprising coupling devices for coupling signals into and out of said optical resonator.

24. The amplifier of claim 23, wherein said coupling devices comprise at least one optical coupler.

25. The optical amplifier of claim 23, wherein said coupling devices comprise at least one optical circulator.

26. An optical amplifier, comprising:
    an optical resonator for producing clamped gain, said resonator including a gain medium having an absorption profile and a gain profile, wherein the gain profile is characterized at least in part by inhomogeneous broadening;
    an optical pump source for pumping said gain medium in a tail of an absorption transition of said gain medium to utilize the inhomogeneous broadening to modify the gain; and
    a wavelength-dependent loss element for adjusting the loss to produce a desired gain profile.

27. The amplifier of claim 26, wherein said optical resonator comprises said wavelength-dependent loss element.

28. The amplifier of claim 26, wherein said wavelength-dependent loss element adjusts the loss of the resonator to produce substantially flat gain.

29. A method for optical amplification having substantially flat gain, comprising:
    introducing a pump signal into a gain medium having an absorption profile and a gain profile, the gain medium residing within a resonator, the gain profile being characterized at least in part by inhomogeneous broadening, the spectral output of the pump signal being selected to pump a tail of the absorption profile to utilize the inhomogeneous broadening of the gain medium;
    injecting a plurality of optical signals of different wavelengths into the gain medium to amplify the optical signals, wherein the respective wavelengths of the optical signals fall within the gain profile of the gain medium;
    utilizing stimulated emission within the gain medium to clamp the gain of the gain medium over a spectral region that includes the wavelengths of the optical signals; and extracting amplified optical signals from the gain medium.

30. The method of claim 29, further comprising adding codopants to the gain medium to enhance the inhomogeneous broadening of the gain profile.

31. The method of claim 29, further comprising controlling the gain by varying loss within the resonator.

32. The method of claim 29, comprising restricting laser oscillation to a direction opposite that of the direction of propagation of the injected optical signals.

33. The method of claim 29, wherein the gain medium comprises a doped fiber.

34. The method of claim 29, further comprising controlling the gain flatness by adjusting a wavelength dependent loss element within the resonator.

35. The method of claim 29, wherein the stimulated emission comprises laser emission.

* * * * *